United States Patent [19]
Solares et al.

[11] Patent Number: 5,376,800
[45] Date of Patent: Dec. 27, 1994

[54] HIGH RESOLUTION TRACK ETCH AUTORADIOGRAPHY

[75] Inventors: Guido Solares, Arlington; Robert G. Zamenhof, Brookline, both of Mass.

[73] Assignees: New England Medical Center Hospitals, Boston, Mass.; a part interest; Massachusetts Institute of Technology, Cambridge, Mass.; a part interest

[21] Appl. No.: 120,126

[22] Filed: Sep. 10, 1993

Related U.S. Application Data

[62] Division of Ser. No. 801,952, Dec. 3, 1991, Pat. No. 5,296,090.

[51] Int. Cl.$^5$ ............................................. G01T 5/00
[52] U.S. Cl. ............................................. 250/472.1
[58] Field of Search ..................... 250/472.1, 473.1

[56] References Cited

U.S. PATENT DOCUMENTS

| | | | |
|---|---|---|---|
| 3,418,472 | 12/1968 | Evans | 250/473.1 |
| 3,493,751 | 2/1970 | Davies et al. | 250/473.1 |
| 4,725,332 | 2/1988 | Spohr | 156/626 |
| 4,737,234 | 4/1988 | Ruddy | 156/626 |

FOREIGN PATENT DOCUMENTS 2241793  3/1975  France .............................. 250/472.1

OTHER PUBLICATIONS

J. E. Kirsh, "Neutron–Induced Track Etch Autoradiography Studies in Tract Detection and Neutron Capture Therapy", Ph.D. Thesis, Nuclear Engineering Department, Massachusetts Institute of Technology, Cambridge, (Feb. 1984), pp. 405–406, 414–416, 469–477, 485–491, 494–497, 707–734.

*Primary Examiner*—Constantine Hannaher
*Attorney, Agent, or Firm*—Fish & Richardson

[57] ABSTRACT

A detector assembly for use in obtaining alpha-track autoradiographs, the detector assembly including a substantially boron-free substrate; a detector layer deposited on the substantially boron-free substrate, the detector layer being capable of recording alpha particle tracks and exhibiting evidence of the alpha tracks in response to being exposed to an etchant, the detector layer being less than about 2 microns thick; and a protective layer deposited on the detector layer, the protective layer being resistant to the etchant and having a thickness of about 0.5 to 1 microns.

8 Claims, 5 Drawing Sheets

| Film | Ellipsometry Thickness (Å) | Observed Color (Glass at 45°) | Observed Color (Water at 45°) |
|---|---|---|---|
| Lexan | 6686 | Blue | — |
| Lexan | 7365 | Blue/Purple | — |
| Lexan | 7923 | Purple/Red | — |
| Lexan | 8100 | Purple/Red | — |
| Lexan | 8702 | Green | — |
| Ixan | 1594 | — | Gold |
| Ixan | 2082 | — | Violet |
| Ixan | 2251 | — | Blue |
| Ixan | 2315 | — | Blue |
| Ixan | 2438 | — | Blue/Green |
| Ixan | 2628 | — | Green |
| Ixan | 2745 | — | Yellow |
| Ixan | 3057 | — | Yellow/Red |
| Ixan | 3177 | — | Red |
| Ixan | 3368 | — | Red/Violet |
| Ixan | 3487 | — | Purple/Red |

| Standards estimated conc. (mg $^{10}$B/Kg) | # of Tracks from autoradiography | Track Density (tracks/μm²) | $^{10}$B Conc. from PGAA (mg $^{10}$B/Kg) |
|---|---|---|---|
| 0 | 10 ± 3.2† | 8.4E-04 ± 2.7E-04 | 0.3 ± 0.0† |
| 5 | 137 ± 11.7 | 8.2E-03 ± 7.0E-04 | 4.2 ± 0.2 |
| 10 | 208 ± 14.4 | 1.2E-02 ± 8.3E-04 | 8.5 ± 0.4 |
| 15 | 306 ± 17.5 | 1.8E-02 ± 1.0E-03 | 11.1 ± 0.6 |
| 20 | 375 ± 19.4 | 2.2E-02 ± 1.1E-03 | 16.3 ± 0.8 |
| 50 | 983 ± 31.4 | 5.6E-02 ± 1.8E-03 | 44.7 ± 2.2 |

† ± 1 σ standard error.

FIG. 9

HIGH RESOLUTION TRACK ETCH AUTORADIOGRAPHY

The Government has rights in this invention pursuant to DOE Grant No. DE-FG02-87ER-6060 awarded by the Department of Energy.

This is a divisional of copending application Ser. No. 07/801,952, filed Dec. 3, 1991, now U.S. Pat. No. 5,296,090.

BACKGROUND OF THE INVENTION

The invention relates generally to autoradiography and more specifically to high resolution alpha-track autoradiography.

The term autoradiography is quite general and its use has been applied to numerous fields of research. Autoradiography by itself encompasses the automatic (auto-) or spontaneous production of an image (-graphy) by radiation (-radio-). The prefix "auto" implies that the necessary radiation comes from within the object being imaged (as opposed to "radiography" which is the production of an image by an external source of radiation such as x-rays). This can be induced, as in neutron-induced autoradiography with such reactions as $(n,\alpha)$, $(n,p)$ or $(n,f)$, or spontaneous, which is most commonly encountered by labelling the object or tissue with radioactively decaying isotopes such as the beta emitters, $^3H$, $^{14}C$, $^{35}S$, and $^{32}P$. Different labels on different drug compounds that would be incorporated into the object, such as an animal or a plant, produce different images, each which tells a separate story about the drug and its distribution within the sample. In many cases, investigators clarify the description by denoting the term as H-autoradiography or neutron-induced alpha autoradiography, for example.

Levels of resolution at which the test sample is to be imaged plays an important role in deciding which technique and/or radioisotope to use. Through the use of large microtomes, entire body sections can be cut to produce macroscopic or whole-body autoradiographs. At low magnification, microscopic or light microscopic autoradiography is performed and finally at extremely high resolution, electron microscopic autoradiography is used. All three levels of producing autoradiograms requires very different procedures and many times entirely different radioisotopes.

Unlike radiology and clinical imaging, autoradiography is a research technology to study detailed distributions of radiolabels for toxicological and pharmacological testing of drugs, new compounds, or environmental effluents that may enter the body. Aside from biological applications, it is also used to investigate doping of semiconducting materials, imperfections in crystals and even to investigate authenticity of oil paintings and the styles of the painters who painted them. In order to do so, an interface of the specimen is placed in contact with some medium that is capable of detecting the radiations coming from the sample. This medium which is used to produce the image or distribution of the radiation emitting compound has for the majority of the history of autoradiography been a photo-sensitive emulsion not unlike that which is used in standard photography and x-ray imaging. In this process, the sample is basically placed in contact with the photo-emulsion and protected from light. The radiation coming from various parts of the sample then sensitize the emulsion at those points similar to light exposing a photographic film. Over a certain period of time, the exposure is sufficient to have sensitized enough of the film and it is then developed, thus revealing the regions corresponding to high activity of the radioisotope. This is the basis for all autoradiography that has become known as conventional, emulsion, or isotopic autoradiography.

There is a need for choosing a detector medium that is sensitive enough to detect alpha particles but at the same time insensitive to protons. An appropriate medium that satisfies this condition is bisphenol-A polycarbonate ($C_{16}H_{14}O_3$) available commercially as Lexan (General Electric Co., Pittsfield, Mass.). Its many properties, including for example flexibility and transparency, are very favorable for this application. Other Polymers such as Polyethylene terephthalate, cellulose acetate, and cellulose acetato butyrate, are also acceptable, but by far the most extensively studied in track detection has been Lexan, which is the detector used in the embodiment to be described.

SUMMARY OF THE INVENTION

In general, in one aspect the invention is a detector assembly for use in obtaining alpha-track autoradiographs. The detector assembly includes a substantially boron-free substrate; a detector layer deposited on the substantially boron-free substrate; and a protective layer deposited on the detector layer. The detector layer is capable of recording alpha particle tracks and exhibiting evidence of the alpha tracks in response to being exposed to an etchant, and is less than about 2 microns thick. The protective layer is resistant to the etchant and has a thickness in the range of about 0.5 to 1 microns.

Preferred embodiments have the following features. The substantially boron-free substrate is a quartz microslide. The detector layer is made of bisphenol-A polycarbonate, e.g. Lexan polycarbonate. The protective layer is made from a vinylidine chloride/vinyl chloride solution, e.g. Ixan-SGA Vinyl Copolymer. The protective layer is about 0.8 microns thick and the detector layer is less than about 1 micron thick.

The technique established here uses a very thin film of Lexan ($\approx 0.8$-$1.0$ $\mu m$). Even though thin film techniques typically tend to be complicated and tiresome, the technique described herein provides a non-destructive method. Another feature of this technique is that it provides a way of keeping the image of the stained tissue and the alpha tracks in the same slide at the same time. Contrary to the superimposition technique, the invention maintains the correspondence between the tissue morphology and the alpha tracks.

One advantage of the invention is that it enables an investigator to analyze, at a cellular level and at resolution of about 1 $\mu m$, the distribution of diffusible boron drugs in tissue. The invention also enables the user to maintain accurate correlation between the $\alpha$-tracks (i.e., boron atoms) and the tissue morphology at all times.

In addition, this technique should be able to preserve the tissue so that subsequent retrieval, multiple evaluation, and reproducibility is possible. In general, the prior techniques for doing autoradiography which are capable of yielding good results (i.e., high resolution) do so at the expense of permanently losing the original tissue. The disadvantages of such destructive methods are obvious, the autoradiographic image can only be observed once and it can never be re-examined again.

Other advantages and features will become apparent from the following description of the preferred embodiment and from the claims.

DESCRIPTION OF THE PREFERRED EMBODIMENT

STRUCTURE AND OPERATION

Experimental Procedure

First there will be presented a general description of the high resolution track etch autoradiography (HRTEA) technique implemented herein. This is followed by a more detailed explanation of each step involved.

Figure 1:
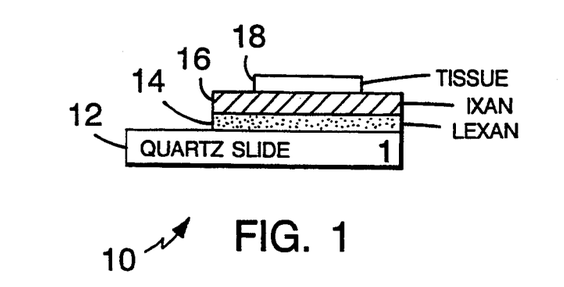
FIG. 1 is a three layer, alpha track detector assembly.

Referring to FIG. 1, a detector assembly 10 constructed in accordance with the invention is a three layer structure including a quartz microslide 12, an alpha track detector layer (e.g. a Lexan film) 14 and a protective layer (e.g. a Ixan film) 16. A tissue section 18 containing the material of interest, e.g. boron, is placed on top of Ixan layer 16. The complete assembly is then exposed to neutron radiation to generate the alpha radiation which leaves tracks in Lexan file 14 that can be made visible by using an etching technique to be described later.

A summary description of the steps involved in the HRTEA are as follows. First, quartz glass microscope slide 12 is coated with a solution of 8% Lexan dissolved in dichloromethane forming a $\approx 0.8$ to 1.0 micron Lexan film 14 over slide 12, which constitutes an alpha particle detector with intrinsically low sensitivity to lower LET background radiation components such as protons. A drop of Ixan solution (vinylidine chloride/vinyl chloride) is placed on the surface of a water bath creating an $\approx 0.8$ $\mu$m film of Ixan on the water surface. Ixan film 16 is transferred to the slide to coat the surface of Lexan film 14. The Lexan and Ixan films 14 and 16 are laminated together by exposing them to dichloromethane vapor. Ixan film 16 provides a physical barrier between tissue section 18 on top of Ixan film 16 and the highly caustic etching solution which is used to etch the alpha tracks from the opposite side of Lexan film 14.

Note that it is important that the Ixan layer be sufficiently thick so that it protects the tissue from the etchant throughout the etching step. Of course, a thicker Ixan film could be used but there would be a corresponding loss in resolution. Thus, there is a crucial range of thicknesses which will actually achieve the desired result, assuming that all of the other steps in the autoradiograph procedure are closely followed. The preferred thickness of the Ixan film lies in the range of 0.5 to 1 microns.

Tissue section 18 is prepared as follows. Tissue is frozen in acetone and dry ice, embedded in Optimal Cutting Temperature (OCT) compound (Miles Inc, Diagnostic Division, Elkhart, Ind.), and 1-2 $\mu$m sections are cut using a cryostatic microtome. Tissue section 18 is immediately transferred onto the surface of Ixan film 16.

Detector assembly 10 with tissue section 18 are is packed in dry ice and irradiated with thermal neutrons (e.g. in one of the reactor in-core rabbit facilities at the MITR-II). Alpha particles generated as the result of neutron captures by $^{10}B$ in the tissue impinge on Lexan film 12 and create stress points. After the sample is irradiated, the tissue is stained with a modified Hematoxylin and Eosin (H&E) method.

Figure 2:
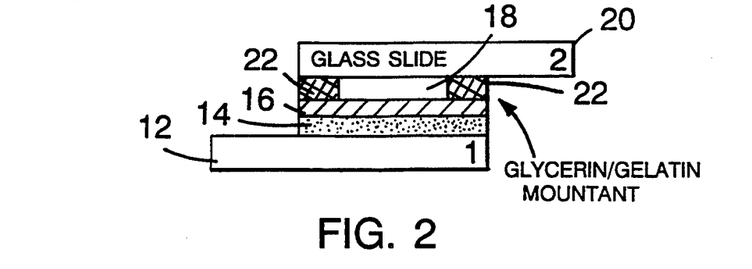
FIG. 2 shows a second slide applied to the detector assembly to aid reversing the order of the layers prior to etching.

Referring to FIG. 2, a second glass slide 20 is mounted on top of the stained tissue section 18 using glycerol/gelatin mountant 22, and the arrangement refrigerated for 2 days at a temperature of $\approx 4°$ C. Quartz slide 12 is then carefully removed, leaving Lexan film 14, Ixan film 16, and tissue section 18 adhering to glass slide 20 in reverse order, i.e., with Lexan film 14 now exposed to the outside.

Lexan film 14 is etched using a solution of 15% KOH in ethanol and water. Ixan film 16 provides a physical barrier to prevent the caustic etchant from damaging the stained tissue. Slide 20 is finally rinsed in distilled water and dried in air. Slide 20 can then be viewed under a light microscope with stained tissue 18 and tracks being visible simultaneously, or it can be viewed by a CCD camera and digitized for computer analysis.

High resolution autoradiography is a technique that requires several steps and each step is critical to its success. Once the methods for each step have been mastered, the complete analysis of a tissue section can take on the order of 8 days. This length of time is rather short if one compares it to the time that would be necessary for high resolution conventional autoradiography, which typically takes on the order of weeks and in some instances even months.

The next sections describe in detail each step. The entire high resolution autoradiography procedure can be subdivided in three stages, namely, pre-irradiation, irradiation, and post-irradiation.

The pre-irradiation stage involves setting up the slides for autoradiography. This includes coating the Lexan and Ixan and mounting of the tissue section. Fabrication of the Lexan solution takes approximately 8 to 10 hours and coating of the slides with the Lexan can take as little as 5 minutes per slide plus another 30-45 minutes for drying. (It is very important to make a fresh Lexan solution each time an experiment is carried out.) Manufacturing of the Ixan solution takes from 24 to 48 hours. Casting the Ixan on the slide requires about 10 minutes per slide and an additional 3-4 hours for drying. Note that the Lexan time estimates are close to absolute values and the Ixan casting of the slides depends on the experience of the person doing the work. The last step of the pre-irradiation stage is the mounting of the tissue section on the slides. Depending on the desired tissue thickness and the ability of the person using the cryostatic microtome, this step can take from about 10 minutes for a 10 $\mu$m-thick section to about 30 minutes or 45 minutes for a 1 $\mu$m-thick section.

The irradiation stage includes packing the autoradiography slide with dry ice and the irradiation per se.

The time required is approximately 12 hours and includes packing, irradiation ($\approx 15$ min) and decaying time waiting.

The post-irradiation stage involves staining, separating and etching. These steps may take about 2 days to complete, including about 1 day during which the slides must be stored in a cold room.

Figure 3:
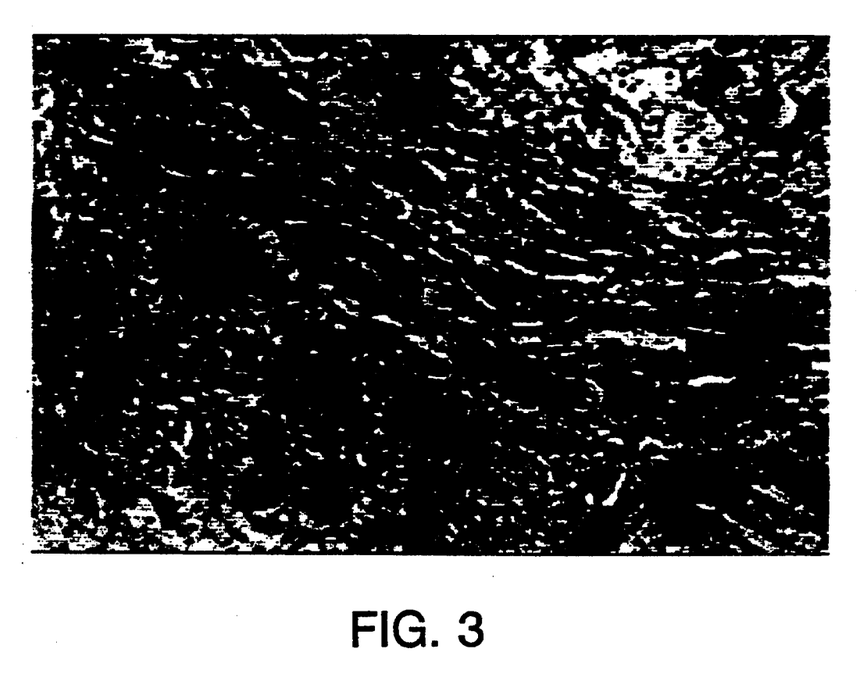
FIG. 3 shows high resolution autoradiography from a normal dog whose brain shows a uniform distribution of $^{10}B$.

FIG. 3 shows a high resolution autoradiograph, where the stained tissue and the tracks appear simultaneously. The black circular objects are the alpha tracks, the ellipsoid dark gray objects are the nuclei, the light gray region is the cytoplasm and the white objects correspond to the extracellular space, freezing artifacts, or broken tissue. The image is from a normal dog whose brain was soaked in a boric acid solution for 2 days.

STAGE I: PRE-IRRADIATION AUTORADIOGRAPH ARRANGEMENT

This stage of the autoradiography encompasses mainly four steps. A fifth step involving cleaning of the slides could also be included. The slides used for the high resolution autoradiography are quartz slides (Quartz Plus, Inc., Newton, Mass.). The reason for using quartz is that quartz slides have very little boron contamination. Regular glass slides can contain large amounts of boron. The boron atoms will capture thermal neutrons and produce a high source of background tracks in the Lexan. Some glass slides brands will have such large amounts of boron that it is simply impossible to work with them (e.g., Soda Lyme glass slides contain 15% (w.) $Na_2BO$). Quartz slides, however, are expensive. Therefore, it may be desirable to re-use them several times until they break or become too scratched that they produce too many artifacts.

After each experimental run the quartz slides should be cleaned following the procedure listed below:
1) Soak the slides in warm water and detergent (e.g., Alconox, Alconox, Inc., New York, N.Y.) for about 2 hours, to remove previous tissue, gelatin, Lexan and Ixan. Then rub or wipe off any debris which might be present.
2) Rinse in warm water several times.
3) Rinse in distilled water or de-ionized water a number of times and air dry the slides in a dust-free environment.
4) Submerge the slides in Methylene Chloride (Dichloromethane, $CH_2C_{12}$) (Fisher Scientific, Fair Lawn, N.J. Part No.: D143-4) for 10 minutes to remove impurities of the Ixan and Lexan that sometimes is still stuck on the slide, especially toward the edges of the slide.
5) Allow the slides to air dry in a dust-free environment, when dry the slides are ready to use.

Rubber gloves, thoroughly washed to removed particulate matter, should be worn during the entire procedure. To reduce possible radiation hazard, sodium contamination due to perspiration, overall handling, and other possible foreign sources should be minimized. Sodium activates upon thermal neutron irradiation in accordance with the following reaction $^{23}Na(n,\gamma)^2\text{-}4Na(\delta=0.53$ barns, $T_{\frac{1}{2}}=15$ hrs). Although, this does not affect the autoradiograph since Lexan is insensitive to gamma rays, appreciable amounts of sodium present can create a hazard when handling the specimen after an irradiation. In addition, to minimizing sodium contamination, cleaning is necessary to minimize background tracks due to boron from other sources than the sample.

Production of Lexan Detector

In the described embodiment, a dipping method is used to produce a thin, uniform and reproducible Lexan film with relative ease. The preparation of the Lexan film and the dipping technique will now be described.

First, a Lexan solution is prepared by dissolving Lexan resin (General Electric Co, Pittsfield, Mass.) in Methylene Chloride. The solution recipe includes 8 grams of Lexan resin and 92 grams of Methylene Chloride. The Lexan resin is dissolved in the Methylene Chloride by stirring constantly with a magnetic bar stirrer. Total dissolution takes approximately 6-8 hours. Since Methylene Chloride evaporates rapidly at room temperature, the container should be covered at all times to minimize evaporation. This produces an 8% (w.) solution.

After use, a Lexan solution can be stored for re-use. However, long-time storage ($\geq 2$ months) is not recommended. To store a stock solution of Lexan, it should be kept away from light and sealed in a well stoppered glass container. A suitable glass container is a glass bottle with a glass top roughed at the join and wrapped with several layers of parafilm (American Can Co, Greenwich, Conn.) around the joint externally. To keep out light, the entire glass container can be covered completely with aluminum foil and then stored in a dark place.

Fresh Lexan is transparent. A Lexan solution that has been exposed to light, can be easily recognized because it takes on a "yellowish" color. If the yellowish color is observed, the Lexan should be discarded and a fresh solution prepared.

Figures 4, 4A:
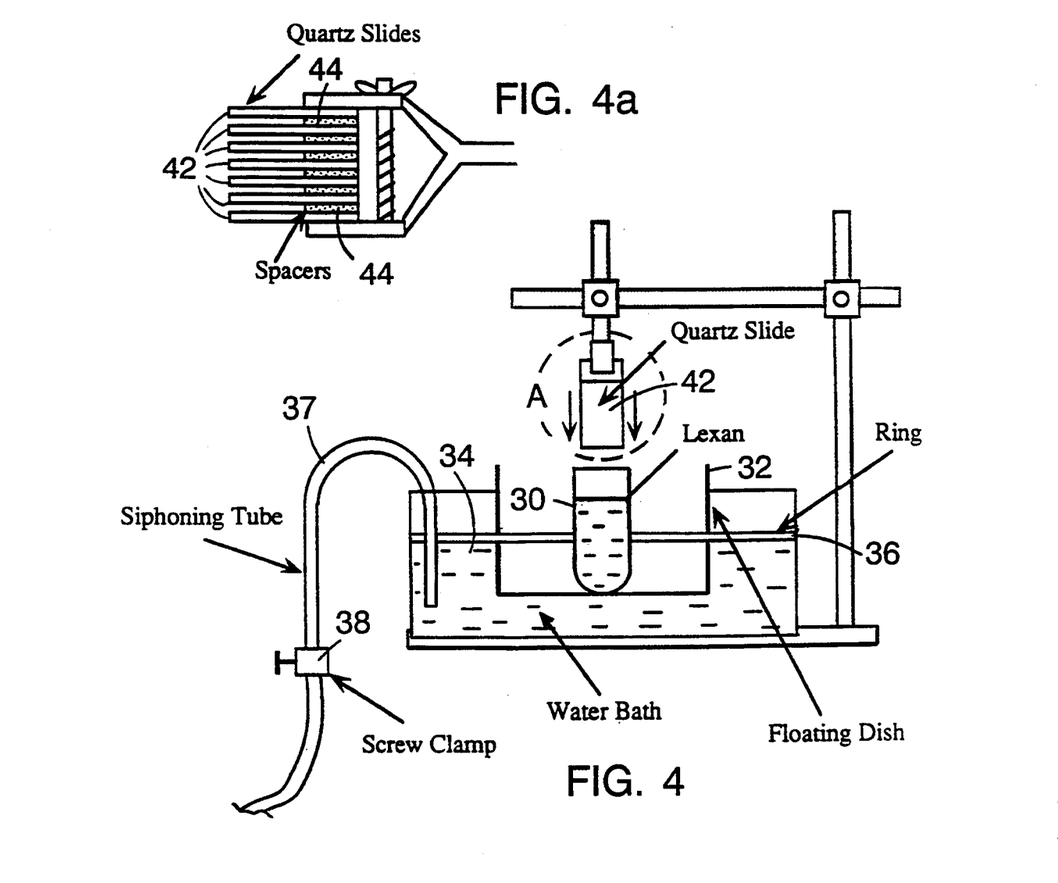
FIG. 4 is a setup apparatus for the production of Lexan films.

FIG. 4 shows a schematic representation of the "Dipping Technique" which is used to coat the autoradiographic microslide with Lexan. A bottle of the Lexan stock solution 30 prepared as described above is placed in the center of a floating dish 32 on a water bath 34. Floating dish 32 has a ring 36 around its outer perimeter, adjusted so that the ring is slightly above the water level. Floating dish 32 is stabilized in water bath 34 by giving it a slight downward push allowing the water to grab ring 36 and hold it by surface tension.

By siphoning the water out from water bath 34 at a constant rate through a siphoning tube 37, both floating dish 32 and Lexan solution 30 also drop down at a constant rate. The rate at which the water is siphoned out can be adjusted by a screw clamp 38. By slowly lowering and submerging microslides 42 in to Lexan solution 30 before the siphoning starts, a thin layer of Lexan will form on slides 42 as Lexan solution 30 drops. The Lexan-coated microslides are held stationary for one minute or so after they are pulled out of Lexan solution 30 to permit them to dry. Note that more than one slide can be coated at a time, if they are arranged with spacers 44 as shown in the diagram; however, coating more than three or four usually will cause the Lexan solution to adhere to the bottom of the microslides preventing the Lexan from forming a uniform coating.

Two parameters are critically important to making a uniform Lexan film using this setup, namely, the concentration of the Lexan and the rate at which the Lexan solution drops. The desired concentration of Lexan is as described earlier. The rate at which the Lexan coats the microslides can be shown to be given by:

$$R_d = \left\{ R_e \Delta_r \left[ \frac{1}{\rho_s} + \frac{1}{\rho_L} \left( \frac{C}{1-C} \right) \right] \sqrt{\frac{\rho \beta}{2 \mu_f}} \right\}^{\frac{1}{2}}$$

where:
$R_d$ = drawing rate
$R_e$ = Solvent evaporation ratio
$\rho_s$ = Solvent density
$\rho_L$ = Lexan density
$\rho_f$ = Lexan solution density
C = Lexan solution weight concentration
g = gravity acceleration
$\mu_f$ = Lexan solution viscosity
$\Delta_r$ = Non-uniform region due to the edge effects
The thickness of the film, $\Delta X$, is related to the drawing rate by:

$$\Delta X = \sqrt{\frac{2 R_d \mu_f}{\rho \beta}} \left[ \frac{\rho_L}{\rho_s} \left( \frac{1-C}{C} \right) + 1 \right]^{-1}$$

To estimated the drawing rate, the following values are substituted into the above equations:
$R_e = 3.3 \times 10^{-4}$ g cm$^2$ sec$^{-1}$
$\rho_s = 1.325$ g cm$^{-3}$
$\rho_L = 1.2$ g cm$^{-3}$
$\rho_f = \approx \rho_s$
C = 0.08
g = 980 cm$^{-1}$ sec$^{-2}$
$\mu_f = 0.69$ g cm$^{-1}$ sec$^{-1}$
This yields Rd = 3.93 cm min$^{-1}$ and a film thickness, DX = 0.73 µm.

These calculated values are in excellent agreement with values measured experimentally. It was established experimentally that using a drawing rate of 4 cm/min will give a film thickness of 0.8 µm.

The thickness measurement is based on the "reflected interference color method" which has been used extensively in thin film measurements and a detailed explanation of the theory behind it can be found in the following references: Vasiceck, A., *Optics of Thin Films*, North-Holland Publ. Co., Amsterdam, (1960); and Heavens, O. S., *Optical Properties of Thin Solid Films*, Academic Press, N.Y., (1955). For the purpose of this work, suffice to say that it is based on the phenomenon that when incident white light goes through a film, the phase change will manifest itself as a reflected interference colors. These interference colors are only observable in thin films and disappear in thick films. The empirical upper bound for a thin film is normally found by the condition that:

n d < 2.5  (4.10)

where
d = thickness of the thin film, µm, and
n = refractive index of thin film.
Typically for a polymer, such as Lexan, n = 1.6. Therefore, d is on order of 1 µm. Since both the Lexan and Ixan films are near or below this thickness, the interference color method is applicable.

When a white light incident shines on a film, the transmissivity and reflectivity of a particular incident wavelength through the film depend on the optical thickness of the film and the surroundings. For optical thicknesses very small compared to the wavelength of the light, the spectral reflectivity varies very little from one wavelength to another so that no interference colors are seen. For optical thicknesses comparable to the wavelengths of the light, a number of extremes in reflectivity intensity occurs in the visible part of the spectrum, giving rise to visible constructive colors.

Figure 5:
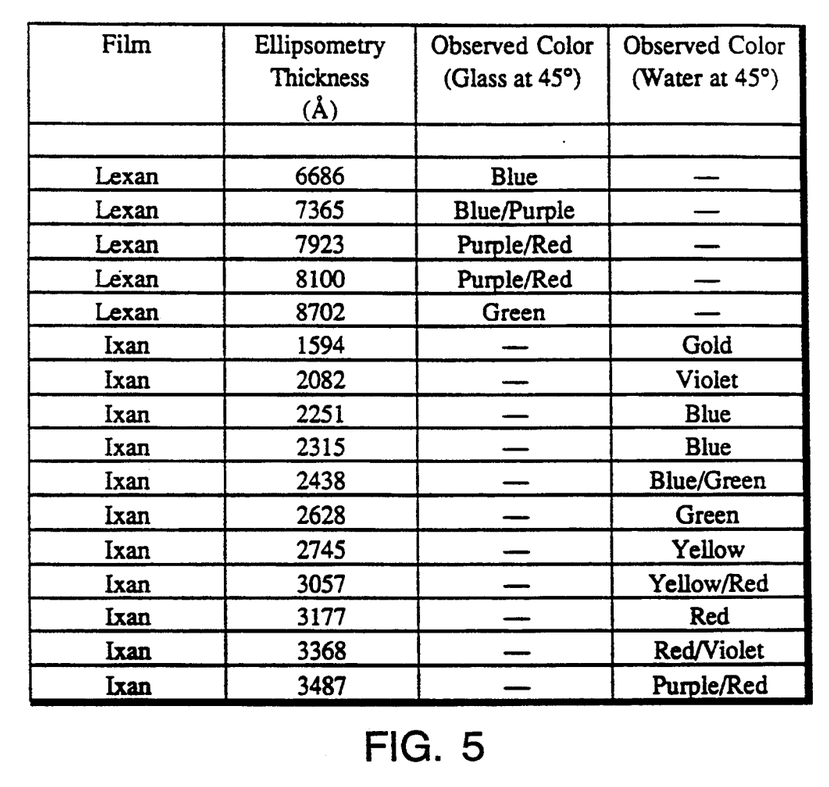
FIG. 5 shows the correlation of film thickness with observed interference colors for Lexan and Ixan films.

The interference colors observed at 45° incident at various film thicknesses, are summarized for Lexan and Ixan in FIG. 5. The reference thicknesses were established by weighting and ellipsometry measurements.

Impermeable Membrane Production

In order to preserve the tissue and its stain, a very thin impermeable membrane must be placed between the tissue and detector. The membrane must prevent any passage of the caustic etching solution to the tissue when etching the detector. Ixan film 16 (see FIG. 1) serves this purpose.

The original recipe used by Keiser and Wijffels for making the Ixan solution is used in the present work and is as follows (also see Keiser, A., Wijffels, C., "The preparation of and use of Polyvinylidene Chloride Protective Films in Autoradiography," Actas Histochem., Suppl. 8, 359–367, (1968)):
Ixan-SGA Resin: 9.7 grams (Solvent).
Butylacetate: 30.0 grams (Solvent).
Trichloroethylene: 57.9 grams (Solvent).
Cyclohexanone: 0.8 grams (Plasticizers)
Dibutylphthalate: 1.6 grams.(Plasticizers)
The procedure for preparing the solution is as follows. Carefully crush the 9.7 grams of Ixan-SGA resin with a mortar and pestle to yield a fine powder. Then, gradually add the Ixan powder to the 30 grams butylacetate while constantly stirring the solution to prevent clusters from forming. Complete dissolution is reached only after approximately 48 hours. After complete dissolution, add the 57.9 grams of trichloroethylene and stir the resulting solution constantly for another 24 hours to yield a clear yellow solution. The last two solvents are used as plasticizers. After filtering the Ixan solution through a millipore filtering apparatus with a filter having a 1.2 µm pore size and 47 mm. diameter, add the plasticizers and again stir the solution for another 12 hours.

It is worth noting that the Ixan solution, like the Lexan solution, is light sensitive and tends to darken significantly if exposed for any length of time to tungsten light or daylight. However, this seems to be a transient effect and does not alter the performance of the solution. In any case, it is probably better to take the same precautions for protecting it from light as are taken to protect the Lexan solution, i.e., store it in a light protected container wrapped with aluminum foil.

Ixan is not as sensitive to aging as Lexan. For instance, if Ixan is stored under the conditions mentioned before it could last for at least three or four months.

Since Ixan is a very dense and sticky substance, containers that are used for its preparation are difficult to clean. However, this task is easily accomplished if these containers are first submerged in methylene chloride.

Figure 6A:
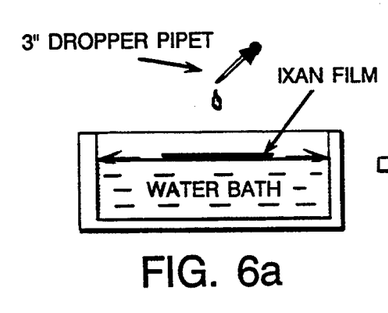
FIG. 6a-d illustrates the procedure for applying the Ixan film.
Figure 6B:
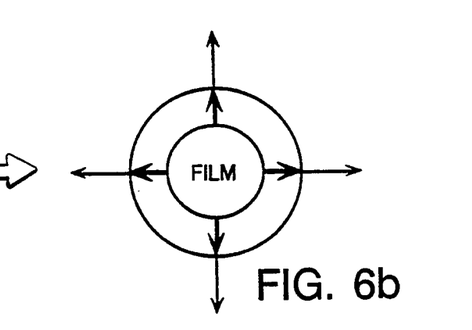

Once the Ixan solution is prepared and ready to use, the film is cast and applied to the slide in the manner illustrated by FIGS. 6a–d. A water bath is prepared by filling a glass dish about 125 mm in diameter and 60 mm deep with de-gassed, de-ionized and distilled water. Since any impurity in the water might result in Ixan films that are unacceptable, Millipore filtration (0.4 µm) of the water is recommended prior to filling the glass dish. The water is added at room temperature ($\approx 25°$ C.) nearly to the edge of the dish. The dust particles floating in the water surface are removed by placing a glassine sheet on the water surface and then gently lifting it off. A pre-cleaned 3" dropper pipet (American Scientific Products, McGraw Park, Ill.) is then used to apply one drop of Ixan solution onto the surface of the water bath (FIG. 6a). The best results are obtained when the pipet is placed close to the surface of the water without touching it. If the drop of solution is dropped from too high, the is likely to drop to the bottom of the container rather than spread out and extend itself over the surface of the water. If applied correctly, the film will spread out evenly and uniformly in a radial fashion due to its highly hydrophobic nature. The interference colors should be clearly visible if a bright light is held incident to the surface of the water and the water surface is viewed from a 45° angle to the surface.

There are usually two major regions formed after the film stops spreading. The most uniform region is in the center of the circular film, in an area which typically will have a diameter of 5 or 7 centimeters. In that area the interference colors are generally violet or blue. In the outermost region, which is shaped like a ring and which represents the thinnest area of the film, the interference color will be a silver-gray color indicating a thickness of less than 500 Å.

It is important to check for the presence of minute holes that sometimes form in the Ixan film. If holes are present, the film will not protect the tissue from the etching solution and is thus not useable. It is recommended that one do a leakage test to familiarize oneself with the detection of holes. The test consists on putting drops of the etchant to the surface of the Ixan film. If there are holes in the film, then a wavy stream of the etching solution is formed underneath the film. Of course, if the leakage test is performed, the film cannot be later used even if no holes where detected.

Figure 6C:
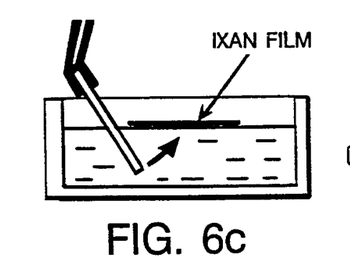
Figure 6D:
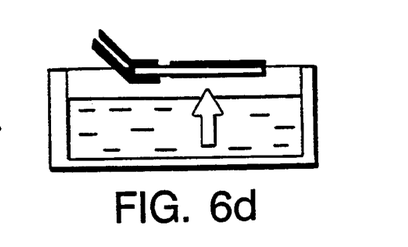

Once the quality of the film has been established, the next step is to pick up the Ixan film with the method illustrated by FIGS. 6c and 6d. By gently touching the outermost ring of the film with a disposable Pasteur pipet (VWR Scientific, San Francisco, Calif.), one can pull the film to one side of the water bath, so as to create enough space on the other side of the water bath to allow the entrance of the microslide into the water without contacting the film. A pair of angled forceps with flat grips may be used to grasp the microslide. Then, the microslide is submerged vertically into the water bath and positioned horizontally under the center of the Ixan film. When properly positioned, the microslide is lifted up until it contacts the underside of the Ixan film. Since the Ixan is very sticky, when the film touches any part of the microslide it adheres to the slide. If the film has been successfully picked up, there will be excess film hanging over the edges of the microslide. The excess should not be eliminated because it can be wrapped around the microslide so as to help secure the Lexan and Ixan films to the slide.

After the Ixan film has been secured, the microslide is turned vertically upside down (i.e., with the forceps at the bottom) to drain off any excess water. Then, the microslide is placed in a dust-free environment where it is allowed to dry. The drying time is usually about 5 hours. A desiccator can be used to dry multiple slides, making sure, of course, that the slides do not touch each other to avoid them adhering to each other.

If the same water bath is used to coat another microslide, one must first make sure that no debris has been introduced onto the surface of the water bath. As before, debris can be picked up by using a glassine sheet (Eli Lilly and Co, Indianapolis, Ind.).

Lamination of Lexan and Ixan

After the slides are dry, both films Lexan and Ixan are laminated. Methlylene Chloride is used in a vapor chamber set up as follows. A glass petri dish of dimensions 35 mm by 10 mm is placed in the center of another petri dish of dimensions 90 by 30 mm. To serve as support for the microslides, two regular Pasteur pipets are placed inside the larger petri dish. Methlylene Chloride is then added to the larger petri dish, in sufficient quantity to reach the height of the smaller petri but not to cover the two pipets. The Lexan/Ixan covered microslide is then placed on top of the pipets and the larger petri dish covered for approximately 50 seconds. The entire arrangement will be saturated with the solvent vapor which will penetrate the Ixan film and laminate it to the Lexan film. Note that if the microslide is left in this arrangement for too long, the solvent will also penetrate the Lexan film. This manifests itself by the Lexan film becoming fogged and no longer useful.

Preparation of Tissue Samples

In order to considerably reduce the diffusion rate of a drug in tissue, it is necessary to freeze it. There are basically two methods of working with tissue containing diffusible substances. One is to Freeze-dry the tissue (i.e., sublimate it) and the other is to work with frozen sections directly. The latter method has been chosen in the described embodiment.

The freezing and cutting of frozen sections are discussed in a number of articles assembled by Stumpf, W. E., Roth, L. J., eds., in *The Autoradiography of Diffusible Substances*, Academic Press, N.Y., (1969), which gives an excellent and useful introduction. When a tissue is frozen, cellular and extracellular water usually freeze at different rates so that depending on the speed of freezing ice crystals are formed. In the ideal physical state where only water is present, vitreous ice is formed with rapid freezing, but it is doubtful whether this ever happens in biological material where there is a rapidly changing complex of solutes. The tissue is damaged by the formation of large ice crystals to an extent which makes sectioning difficult or impossible and which results in a distortion of the subsequent histological detail. The ice crystals formed vary greatly in size and location according to many factors, among them the water content of the tissue and the rate of freezing. Substances which induce supercooling cannot be used when soluble substances are under consideration because they also introduce the probability of relocation in the substances under investigation. The optimum speed of freezing varies considerably from tissue to tissue. In general, therefore, the fastest rate of freezing which is compatible with good preservation should be used in order to "seal" the diffusible substance under investigation into its location at the moment of freezing.

Tissues that have been examined were: mouse brain tumor (glioma: GL261) and mouse normal brain, human brain tumor (glioblastoma multiforme), and human skin melanoma. It was found that the best approach to freezing these tissues is by using the following technique.

About 2 cc of O.C.T. compound (an embedding compound available from Miles Inc., Elkhart, Ind.) is placed inside a small plastic container. A small piece of unfixed tissue ($\approx 1$ cc) from a recently ($\approx 5$ mins) killed animal or a small block of tissue from a human biopsy is transferred to the plastic container with the O.C.T. The tissue is placed inside the plastic container so as cover it completely with the O.C.T.. If any part of the tissue cannot be covered, then more O.C.T. is poured directly on top of the tissue. Next, a plastic cold-resistant (thermos TM) container (20 cm deep × 10 cm diameter) is filled with 250 cc of acetone and then about two or three 50 cc pieces of dry ice (solid $CO_2$) are dropped inside the acetone to bring the temperature of the acetone to that of solid carbon dioxide ($-76°$ C.).

The small plastic container with the tissue immersed in O.C.T. is then grabbed by one corner with a long pair of forceps and partially submerged in the cooled acetone. The container should not be submerged completely, only its bottom part. After about 5 seconds, the O.C.T. will start to solidify at which point the small plastic container will float on the surface of the acetone. After about 30–45 seconds the O.C.T. and the tissue will have solidified completely. The small container is then removed from the surface of the acetone and its content can now be stored or placed in the cryostatic microtome for sectioning.

The next step is sectioning the tissue and then transferring it to the Lexan/Ixan covered microslide. The sectioning of the tissue has to be done on a cryostatic microtome.

The optimum temperature at which the sections should be cut varies considerably for different tissues. In general 1-5 $\mu$m sections can be cut from most tissues in the region of $-20°$ C. to $-35°$ C. A desirable practice is to set the microtome's knife at a lower temperature than the tissue. If that is not possible to achieve with the existing structure in a given microtome, it can be accomplished by modifying the structure slightly, i.e., by fitting a trough filled with dry ice to the microtome handle.

In the described embodiment, the "box" temperature (i.e., the knife temperature) was always set at $-24°$ C. and the "object" temperature (i.e., the tissue temperature) was set at $-20°$ C. The tissues analyzed were cut at 1 to 4 $\mu$m thick.

After a successful section has been cut, the section hangs from the edge of the microtome knife. The section can be picked up by gently touching a cold ($\approx -5°$ C.) Lexan/Ixan microslide against the section. The section will adhere to the films due to temperature differential (sections at $-20°$ C. and films at $-5°$ C.). The exact forces involved are not presently known, though it is probable that static charges between the section and the films play some part in the initial adhesion.

After the section has been picked up, the microslide is kept inside the microtome to prevent the section from melting. When the last section has been picked up, the entire batch of microslides is placed inside a container with dry ice. Sections picked up in this way do not melt and typically remain in perfect contact during irradiation, staining and subsequent etching.

STAGE II: IRRADIATION OF SAMPLE

After the tissues have been cut and mounted on the microslides and stored with dry ice in the cryostatic microtome, they are re-packed in polyethelene bags and inserted into a special plastic reactor-used container called a "rabbit". Dry ice is also inserted inside the rabbit. During all of the handling, the microslides are always kept in contact with dry ice to prevent melting of the tissue sections.

The rabbit is placed in the thermal irradiation facility, e.g. the facility called 2PH2 in the 5 MW MITR-II Research Reactor at the Massachusetts Institute of Technology. The MITR-II Reactor is a tank-type reactor, having two tanks, namely, an inner tank for the light water coolant-moderator and a outer tank for the heavy water reflector. The fuel elements are fully-enriched (93%) uranium and are positioned in a hexagonal core structure which is 15 inches across, at the bottom of the core tank. Power is controlled by six shim blades and an automatic regulating rod. The pressure in the system is practically atmospheric, and the temperature just slightly over 100° F. An exterior shield of dense concrete makes it possible for research workers and students to conduct experiments and training without radiation hazards.

To prevent overheating of the Lexan, the irradiations are always carried out at low power, e.g. during the weekly power level start-ups. The irradiations are done at 100 kW and last for 15 mins. In addition, gold foils are packed with the microslides to monitor the thermal neutron flux. The measured thermal flux in the 2PH2 port is: $1.86 \times 10^{10}$ n cm$^{-2}$ sec$^{-1} \pm 0.39 \times 10^{10}$ n cm$^{-2}$ sec$^{-1}$ at 100 kW. During irradiation, the temperature in 2PM2 port has been shown to rise from 24° C. to 26° C. which is small enough not to cause any problems.

The main radioactivation product that results from the irradiation of the microslides is $^{24}$Na. As mentioned earlier, this product comes from the reaction: $^{23}$Na(n,$\gamma$)$^{24}$Na ($\sigma=0.53$ barns, $T_{\frac{1}{2}}=15$ hrs). $^{23}$Na is present in the tissue itself and in fingerprints if rubber gloves are not carefully used during the total handling of the microslides. A normal waiting period for retrieval of the slides is typically 2 days. There is also production of $^{31}$Si ($T_{\frac{1}{2}}=2.6$ hrs) in the microslides, which comes from neutron activation of the quartz.

STAGE III: POST-IRRADIATION AUTORADIOGRAPH PREPARATION

The post-irradiation stage is as important as the previous two. This is the stage during which the tissue is stained so that it can be viewed simultaneously with the alpha tracks. This is also the stage during which the reversal and separation of the quartz and glass slides is accomplished. Tissue staining is usually not a problem in this technique. It follows a standard Hematoxylin and Eosin staining method. If the tissue is not completely adhered to the Lexan, some of the samples may be lost during this process. The reversal of the quartz and glass slides is a critical and sensitive step. The last step, i.e., etching, is also vital for the success of this high resolution autoradiography technique.

Tissue staining

By far the most commonly used staining method in histotechnology is Hematoxylin and Eosin staining, more commonly known as "H & E" staining. Hematoxylin, a natural dye which was first used about 1863, is the most valuable staining reagent used in histological work. It has little affinity for tissue when used alone but in combination with aluminium, iron, chromium, copper or tungsten it is a powerful nuclear stain. The most common formulas for staining with hematoxylin are the combinations with aluminium in the form of alum. Sections stained with alum hematoxylins may be counterstained with Eosin, a contrast stain. The general formulation of the H & E method used in work was done by Harris. (See, Luna, L. G., ed., *Manual of Histologic Staining Methods of the Armed Forces Institute of Pathology*, 3rd ed, McGraw-Hill Book Co., N.Y., (1968)).

The formula for the so-called "Harris Hematoxylin" follows as well as the formulae for the other solutions that are used in the H & E stain.

| Hematoxylin Crystals | 5.0 grams |
|---|---|
| Alcohol, 100% | 50.0 ml |
| Ammonium alum | 100.0 grams |
| Distilled water | 1000.0 ml |
| Mercury oxide | 2.5 grams |

The hematoxylin is dissolved in the alcohol. The alum is dissolved in the distilled water with the aid of heat. After the alum is dissolve, it is removed from heat and the two solutions are mixed together. This can be facilitated by stirring while bringing the combined solution to a boil as rapidly as possible (limit heat for a minute and stir often). When the mixing is complete, the combined solution is removed from heat and the mercury oxide is slowly added. Then, the mixture is reheated to a simmer until it becomes dark purple, at which point it is removed form the heat immediately and the vessel is plunged into a basin of cold water until it becomes cool. The stain is ready for use as soon as it cools. The precision of the nuclear stain can be increased by adding 2–4 ml of glacial acetic per 100 ml of solution. Of course, before the stain is used, it should first be filtered.

The following solutions are used during the staining procedure:

| 1% Stock Alcoholic Eosin | | |
|---|---|---|
| Ingredients: | Eosin Y, water soluble | 1.0 grams |
| | Distilled water | 20.0 ml |
| | Alcohol, 95% | 80.0 ml |
| Procedure: | Dissolve the Eosin completely in the distilled water and then add the alcohol and stir. | |
| Working Eosin Solution | | |
| Ingredients: | 1% eosin stock solution | 1 part |
| | Alcohol, 80% | 3 parts |
| | Glacial acetic acid | 0.5 ml/per 100 ml |
| Procedure: | Just before use, mix the stock eosin solution in the alcohol completely and then add the 0.5 ml of glacial acetic acid to each 100 ml of stain and stir. | |
| Acid Alcohol | | |
| Ingredients: | Alcohol, 70% | 100 ml |
| | Hydrochloric acid | 1 ml |
| Procedure: | Mix both and stir. | |
| Ammonia Water | | |
| Ingredients: | Tap water | 500 ml |
| | Ammonium hydroxide, 28% | 1 ml |
| Procedure: | Mix both and stir. | |
| Saturated Lithium Carbonate | | |
| Ingredients: | Lithium carbonate | 1 gram |
| | Distilled water | 100.0 ml |
| Procedure: | Mix both and stir. | |

The Hematoxylin and Eosin method used in the described embodiment is basically the same as the one recommended in the Luna et al. reference cited above. The main difference, however, is that the staining should be done with pipets rather than by immersing the slides into the solutions as is customary in H & E staining. The reason is that since the tissues that are being analyzed are very thin and no mountant is used to mount the tissue in the Lexan/Ixan coated microslides, it frequently happens that if the whole slide is immersed, in any one of the staining steps, the tissue will detach from the microslide and the autoradiograph will be rendered useless. The procedure that is described below, should be done using a different Pasteur pipet for each solution and special care should be given in each step to apply the solutions very gently.

The steps of the Hematoxylin—Eosin Staining Method are as follows:

1. 50% Ethanol: With the microslide positioned at an angle ($\approx 45°$) pour about 10 drops of ethanol on top of the tissue, letting the ethanol run freely into a container whose contents can be later discarded.
2. Distilled water: Pour 10 drops onto the tissue using the same procedure as described in step (1).
3. Harris Hematoxylin: Position the microslide on a flat surface and then put several drops of hematoxylin on top of the tissue, enough to cover it completely. Allow to stand for 18 minutes.
4. Tap Water: Rinse with tap water until the hematoxylin has been completely removed.
5. Acid alcohol: Differentiate in the acid alcohol. Pour from 3 to 8 drops very quickly on the tissue.
6. Tap Water: Pour 10 drops of tap water onto the tissue very briefly.
7. Check the differentiation on a microscope. Nuclei should be distinct and the background very light or colorless.
8. Ammonia Water or Lithium Carbonate: Pour either one of these solutions onto the tissue until it turns bright blue ($\approx 5$ drops).
9. Tap Water: Wash the tissue several times ($\approx 30$ drops). Note that if the tissue is not adequately cleaned, the eosin will not stain evenly.
10. Eosin: Position the microslide on a flat surface and then put several drops of eosin on top of the tissue, i.e., enough to cover the tissue completely. Allow to stand for 2–3 minutes.
11. 95% Ethanol: Wash with several drops until eosin is completely removed.
12. 100% Ethanol: Pour 20 drops onto the tissue.
13. Tap Water: Pour a few drops onto the tissue until the slide is mounted in the reversal step.

Reversal and Separation

The objective of the reversal and separation step is to reverse the order in which the layers are mounted on the microslide. This is done so that the Lexan detector can be etched to reveal the alpha tracks. After reversal the Lexan, which has recorded the alpha particle tracks, would be the first layer in the autoradiographic arrangement. Directly under the Lexan would be the Ixan and under this layer, the tissue.

As noted earlier, the purpose of the Ixan is to protect the tissue from the caustic action of the etchant. Note that the reversal also has the feature of allowing the Lexan tracks to be viewed, while at the same time permitting observation of the microanatomy of the tissue that lies under it. Since the Lexan and the tissue have been in close contact throughout the experimental procedure, and the resolution of this technique is on the order of 1 $\mu$m, the correlation of the boron tracks and the tissue microstructure is excellent.

Immediately after staining the tissue, the microslides have to be mounted against a second glass microslide (see FIG. 2). The coupling of both slides is achieved by using glycerol/gelatin mountant (Sigma Co, Saint Louis, Mo.). Since the mountant is in solid state at room temperature, it must be warmed in a water bath or oven to about 38° C. before it is applied. After the glycerol/-gelatin liquifies, three drops of it are gently squeezed onto a previously warmed glass slide (also warmed to about 38° C.). Then, the excess water from the recently stained microslide that is to be mounted is removed and the slide is placed on top of the warm glass slide. Both slides are pressed firmly together until the glycerol/-gelatin mountant covers the whole area between both slides. Note that only the area opposed to the Lexan coating should be mounted. Next, the assembly is stored at 4° C. in a cold room for 48 to 60 hours to allow the mountant to firm up.

After removing the assembly from the cold room and allowing it to warm-up for about 5 minutes, the two microslides are separated by applying a quick small "mutually-opposed" torque on the extended end of each slide (i.e., apply the quick torque clockwise on one slide and counter-clockwise on the other).

Note that the two slides will separate at the interface between the Lexan detector and the quartz microslide, making the Lexan the first layer, Ixan the second, and the tissue the third. The resultant assembly is ready for etching.

Etching

The etching of the high resolution autoradiographs is a delicate procedure. The Lexan layer starts out very thin and becomes even thinner after etching. Also, etching is most effective if the etchant used is heated to a high temperature ($\approx 70°$ C.). However, note that the Lexan turns very soft and fragile when heated.

Even though many etchants have been used in solid state autoradiography, two of them are by far the most commonly used, namely, sodium hydroxide (NaOH) and potassium hydroxide (KOH). The later of these two was chosen due to its higher bulk etching rate in Lexan at lower temperatures compared to that of NaOH. In addition, KOH can be mixed with ethanol (EtOH) to improve its bulk etching rate in Lexan.

The KOH recipe used in the described embodiment is usually referred to as a PEW (Potassium—Ethanol—Water) solution and is by weight 15%KOH, 45%$H_2O$ and 40%EtOH:

| PEW Solution | | |
|---|---|---|
| Ingredients: | KOH pellets: | 9 grams |
| | Distilled Water: | 27 grams. |
| | 100% Ethanol (EtOH) | 24 grams |
| Procedure: | In a glass container, completely dissolve the KOH in the distilled water (note that this is an exothermic reaction). Then, add the EtOH and stir. | |

Figure 7:
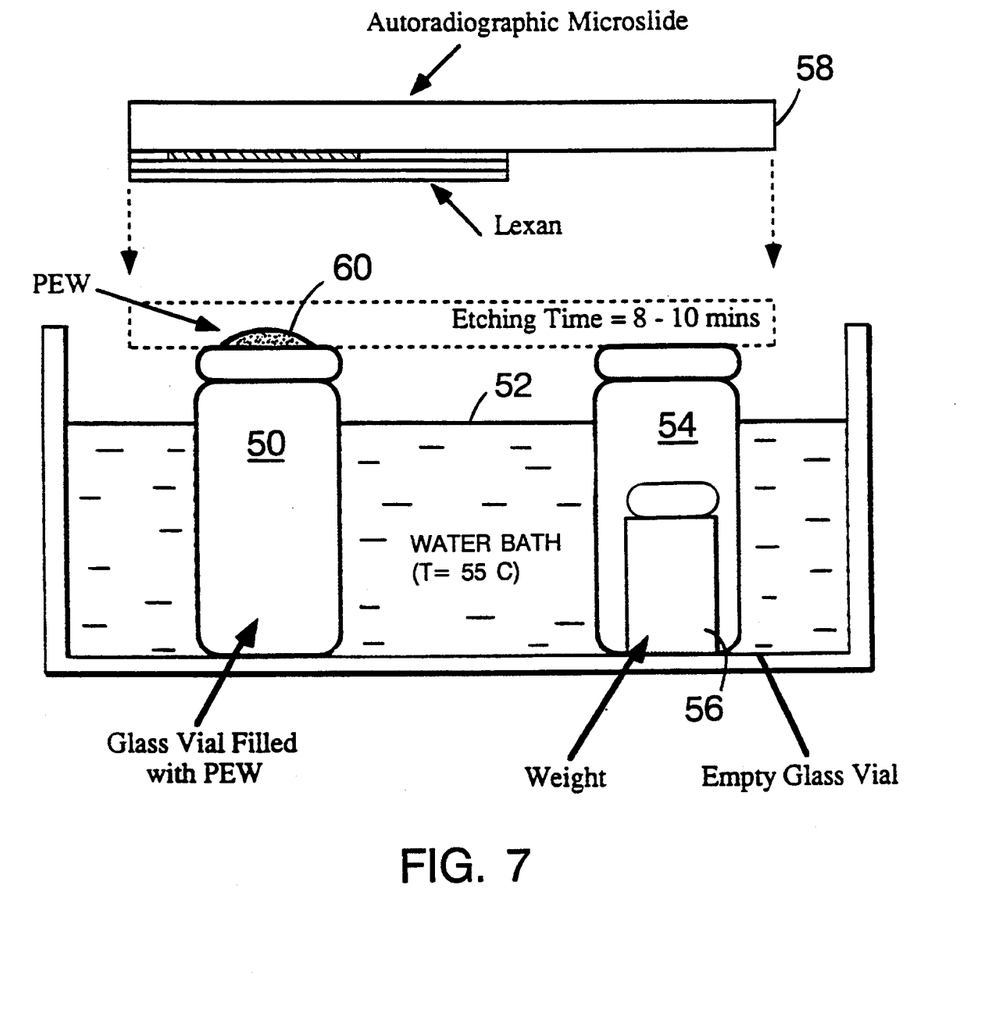
FIG. 7 is a schematic of the etching procedure.

The etching procedure is illustrated with the aid of FIG. 7. A glass vial 50 is filled with PEW solution and placed in a water bath 52 pre-heated to 55° C. Glass vial 52 has a 2.5 cm. base diameter, a 6.0 cm. height and a 2.0 cm. mouth diameter (such as the disposable vials commonly used in liquid scintillation counters (Beckman, Irvine, Calif.)). An empty glass vial 54 of similar dimensions is placed next to PEW-filled vial 50 in water bath 52. Its convenient to put a weight 56 inside empty vial 54 to stabilize it. The empty vial is used only for supporting a microslide 58 containing the tissue sample.

The glass vial with the PEW stock solution should be placed in the water bath, making sure it is tightly closed because the PEW solution is very volatile. After waiting several minutes for the whole arrangement to reach thermal equilibrium and just before placing microslide 58 in the etching solution, a disposable Pasteur pipet (VWR Scientific, San Francisco, Calif.) is used to refill the PEW in glass vial 50. The vial is filled to the top just before the PEW spills. Due to the surface pressure of the PEW, the solution's meniscus 60 has a convex shape as shown in FIG. 7. Note that sometimes small air bubbles are formed in the PEW; these should be removed.

Next, microslide 58 is placed on top of the two glass vials 50 and 54, with the Lexan surface in contact with the meniscus 60 formed by the PEW solution at the top of vial 50. The region of the microslide that is placed on the mouth of the vial is the region of the Lexan immediately above the tissue section.

Sometimes a small air bubble might form inside the etching vial during this procedure. The area above the air bubble will not be etched. Usually the air bubble will be formed toward the edge of the vial's mouth. If the tissue of interest lies above the air bubble, then the microslide should be repositioned carefully without lifting the microslide. If this is not possible then lift the slide, refill the vial with PEW and then situate the slide back in place.

The autoradiograph microslide is etched for about 8 to 10 minutes and then removed from the top of the vial. Following removal, the microslide is tilted approximately 45° degrees, with the Lexan film facing up, and is rinsed with distilled water supplied by a Pasteur pipet. The etchant should be rinsed thoroughly taking great care to not touch the surface of the Lexan film. The microslide is then placed in a standing position for about 15 to 30 minutes and allowed to dry. After the microslide is dry, the autoradiograph is ready to be examined in a light microscope or computer-aided analyzer.

Image Analysis

Analyzing high resolution autoradiographs first requires an evolution of the latent particle tracks (i.e., the "etching" process described above), and second, a quantitative analysis of these etched tracks. Final analysis involves the one-to-one correlation between tissue morphology and track location in the regions that had quantitative density measurements performed on them. Quantitative measurements can yield relative or absolute values of boron uptake within an organ or one of its subregions in mg $^{10}$B/Kg of tissue analyzed. Qualitative autoradiography is concerned with the subjective visualization of differential boron concentration in different regions of the sample.

For quantitative autoradiography, the method employed in the described embodiment was to experimentally generate a standardization curve that relates known concentrations of boron to the track densities they produce upon irradiation. If this is performed for each autoradiographic sample, the task is then simplified since a single curve gives the one-to-one correspondence between track densities and boron concentrations. This method has also been employed and described by Abe et al. (see, M. Abe, A. Kazuyoshi, K. Kitamura, J. Tateishi, H. Hatanaka, "Boron Distribution Analysis by Alpha-Autoradiography", J. Nucl. Med., 27: 677–684, (1986)) and by Gabel et al. (see D. Gabel, H. Holstein, B. Larsson, L. Gille, G. Ericson, D. Sacker, P. Som, R. Fairchild, in "Quantitative Neutron Capture Radiography for Studying the Biodistribution of Tumor-seeking Boron-containing Compounds", Cancer Res., 47: 51–5454, (1987)).

For the computer assisted analysis of autoradiographs, an image analysis system specifically designed for high resolution α-autoradiography was put together. It is based on commercially available components; it is rapid in operation; it can handle a variety of track densities, and it is flexible enough to be useful for the analysis of quantitative histology.

The image analysis system used in this work utilized the following components. It is based on a 16 Mhz Macintosh-II computer interfaced with a Data Translation frame grabber (Data Translation, Inc., Marlboro, Mass.. Model No. DT2255), connected to a Pulnix Charge Coupled Device (CCD Model TM-545i) camera and a Leitz Wetzar light microscope (Leitz Inc., Germany, Model D36833) with 40× and 100× objective lenses. In addition, an Ehman removable 45 MByte hard disk is used for permanent storage of autoradiographs (Ehman Engineering Inc., Wyo.). Furthermore, since images can take up a lot of system memory, and the Macintosh can only access 8 MBytes of RAM memory in its conventional configuration, virtual memory is used with the help of an additional Motorola Page Memory Management Unit (PMMU) 68851 chip installed in the system and VIRTUAL software (Connectix Corporation, Calif.). For displaying of images an 8-bit video card is used, which can display 256 shades of gray or 256 colors from a palette of 16.4 million. Even though the analysis could be accomplished using a monochrome monitor, a color monitor is highly desirable because some of the transformations are better displayed using color or pseudo-color. For production of images suitable for publication, a 24-bit video card should ideally be used, although decreased processing speed would be one disadvantage. The software used for the image analysis and processing of the autoradiographs is Image Analyst (Automatix, Billerica, Mass.), Image (National Institutes of Health, Maryland) and Ultimage (GTFS Inc., Santa Rosa, Calif.).

Absolute Calibration of Autoradiographs

The absolute calibration of the autoradiographs is an essential step toward the determination of $^{10}B$ concentrations in tissue samples. However, in order to produce a standardization curve, known concentrations of boron in a standard medium must be produced. Ideally, a medium that is identical to the tissues being analyzed should be used. The reason for this is as follows.

Consider the detection of alpha particles. There exists a maximum depth within the tissue form which an alpha will traverse the tissue to reach the detector and still have enough energy to create the damage necessary to yield an etched track. Beyond that depth, no alpha particles will contribute to the etched track density. This limiting thickness depends on the range of the alpha particle and the composition and density of the medium it traverses. If, for example, a metal such as iron, $r = 8$ g/cm$^3$, and a tissue equivalent medium, $r = 1$ g/cm$^3$, are loaded homogeneously with equal concentrations of boron, under the same irradiation and etching conditions, they will result in two very different track densities in the Lexan because of the significant difference in range. Therefore, the ideal standard medium should be a tissue, equivalent in these respects to the tissue being examined, cut to the same thickness as the tissue to be examined, and homogeneously loaded with boron at precisely known concentrations.

The number of nuclear reactions occurring in 1 cm$^3$ of tissue during thermal neutron irradiation is given by $$R = \Phi t \sum_i \sigma_{a(i)} (C_i/A_i) N_{av}$$

where, $\Phi$ = Neutron Flux, neutrons cm$^{-2}$ sec$^{-1}$;
t = Length of the irradiation, seconds;
$\sigma_a$ = Absorption cross section, cm$^2$;
C = Concentration of nuclide, g cm$^{-3}$;
A = Atomic weight of nuclide g-mole$^{-1}$;
$N_{av}$ = Avogadro's number, $6.023 \times 10^{-23}$ atoms g-mole$^{-1}$.

At a given thermal neutron flux, the number of $^{10}B(n, \alpha)$ reactions are "roughly" the number of tracks produced from tissue containing $^{10}B$, less the number of tracks in the same tissue without $^{10}B$ (i.e., background), and is proportional to the concentration of $^{10}B$. (Note that the above equation gives only an estimate. The actual theoretical number of tracks expected considers the alpha particles that travel in opposite direction, those alpha particles that never leave the tissue, the alpha particles that strike the detector at an angle less than the critical angle and other detector specific considerations.)

The standards used in the described embodiment were dissected normal mouse brains, which were sectioned in a frozen state at the same thickness as the tissues to be analyzed (i.e., 1 to 2 μm). In order to produce the best possible frozen sections, the water in the brains should first be removed because other-wise freezing artifacts might appear at the time of sectioning. This can be accomplished if the brains are soaked in a glucose solution and left overnight in a refrigerator at a temperature of about 4° C. When the water has been completely displaced by the glucose, the brains that originally floated in the glucose solution will sink to the bottom of the container. In addition, to ensure a homogeneous boron concentration, the glucose solution is mixed with known amounts of unenriched boric acid ($H_3BO_3$), to yield 0, 5, 10, 15, 20, and 50 mg $^{10}B$/Kg.

The exact amounts of boric acid and glucose needed to give a certain $^{10}B$ concentration can be calculated as follows. The percentage per weight of boric acid in solution is given by:

$$\% \text{ (weight)} = 100B/(B+G)$$

where:

B = Amount of $H_3BO_3$, grams;
G = Amount of glucose solution, grams;

Since natural boron contains 19.9% of $^{10}B$, the percentage of $^{10}B$ in natural $H_3BO_3$ is 3.22% (weight). Therefore, knowing that $10^{-4}\%$ (weight) is equal to 1 mg/Kg, it follows that $$C_n = (3.22 \times 10^4) B/(B+G)$$

with: $C_n$ = Desired concentration of $^{10}B$, mg $^{10}B$/Kg.

It has been determined experimentally by high resolution autoradiography, that the tissue will have a homogeneous distribution by leaving the brains in this boronated glucose for at least two days. After removing the brains from the solution, these are frozen using the same methods as the tissues to be examined as described earlier.

Figure 8:
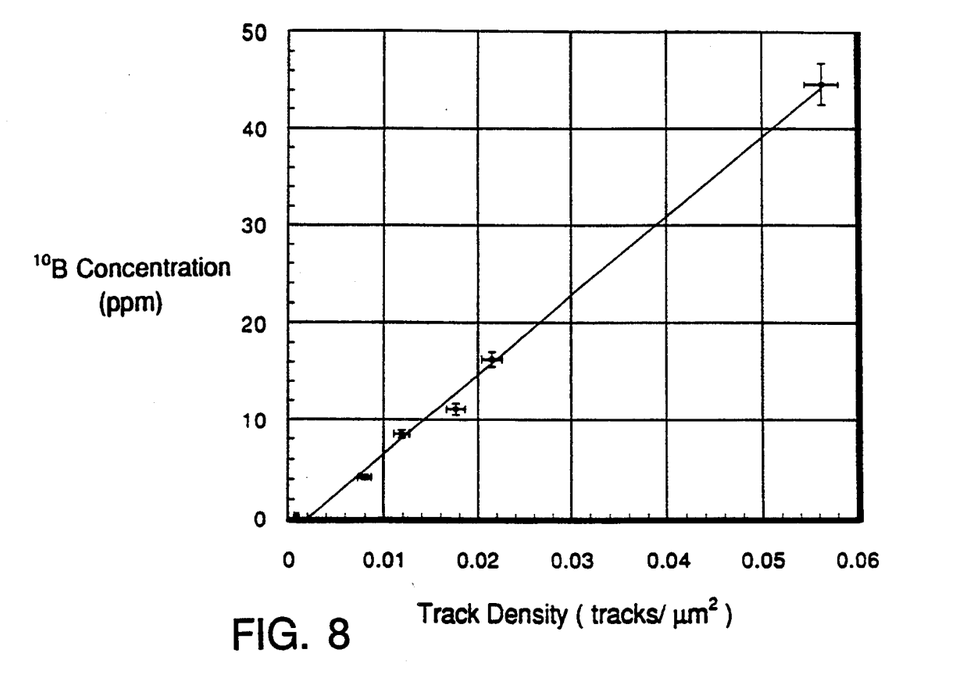
FIG. 8 is a calibration curve for the absolute determination of $^{10}B$.

The standard tissues are irradiated at the same time as the samples. They are then analyzed and a calibration curve of track density versus $^{10}B$ concentration is plotted. This procedure is repeated every time that a new set of tissues is examined. FIG. 8 shows the calibration curve that was used to analyze human tissue samples. The best straight line was fitted to these points. The equation of this line was:

$$C_n(815.23 \pm 73.72)(TD) - 1.59$$

with the standard deviation calculated at 95% confidence level and $C_n = {}^{10}B$ concentration, mg ${}^{10}B/Kg$.

TD = Track density, tracks/Mm$^2$.

The track densities have been found to be linearly proportional to the concentration, provided they lie within saturation boundaries. That is, if the neutron fluence is too high, then at the time of the automatic analysis of the autoradiograph there will be a saturation of tracks and the image analysis algorithm will not provided accurate track identification.

In addition, the boronated glucose is also calibrated against an NBS certified boric acid solution in a prompt gamma activation analysis (PGAA) system that was developed at the MITR-II. The description and operation of this facility are covered in detail by R. Rogus et al. in "Boron-10 Prompt Gamma Analysis Using a Diffracted Neutron Beam," Fourth International Symposium on Neutron Capture Therapy for Cancer, Sydney, Australia, (1990) and by N. S. Lizzo, N. S. in "Prompt Gamma Activation Analysis of Boron-10 in Blood and Dosimetric Measurements Associated with Boron Neutron Capture Therapy," S. M. Thesis; Nuclear Engineering Dept., M.I.T. , Cambridge, Mass. (1988).

Figure 9:
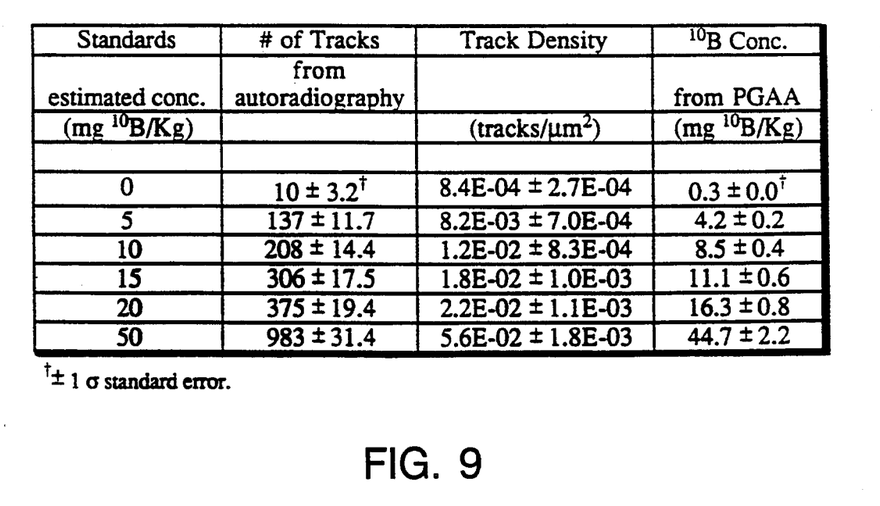
FIG. 9 is a calibration data from the PGAA system.

FIG. 9 shows the results of this calibration. The absolute concentrations of ${}^{10}B$ in the standards is always assumed to be that given by the PGAA measurements.

There is a compromise between the number of tracks that is counted and the statistical accuracy of the results. Since the ${}^{10}B$ (n, $\alpha$) reaction follows a Poisson distribution, the random percentage error one can expect can be estimated. For example, counting 1000 tracks in a given image will result in a percentage error with 95% confidence of 6%, while if counting 100, the error will be 20%.

The number of tracks in the autoradiographs can be varied by varying the thermal neutron flux, the concentration of ${}^{10}B$, or the length of the irradiation. As described earlier, the thermal neutron flux used for the irradiation of autoradiographs is $1.5 \times 10^{10}$ n cm$^{-2}$-sec$^{-1}$ at a reactor power of 100 kWatts. Its value can be increased by irradiating at a higher reactor power. However, increasing the reactor power also increases the temperature in the 2PH2 horizontal port, and that presents a problem for the integrity of the Lexan track detector. The concentration of ${}^{10}B$ is in most cases unknown and is precisely what one wants to measure. Therefore, the variable that was manipulated was the length of irradiation. Experimentally, it was determined that 15 minutes of irradiation in the 2PH2 horizontal port at 100 kWatts produces approximately 200 and 1000 tracks in an image of 140 $\mu$m $\times$ 140 $\mu$m of tissue containing 10 and 50 mg ${}^{10}B/Kg$, respectively.

Images of autoradiographs may be acquired using bright field transmitted illumination. Autoradiographs under this kind of illumination can be viewed in two ways. The first approach involves focusing the microscope on the tracks themselves. In this way the $\alpha$ particles and ${}^7Li$ nuclei tracks appear as black circular dots when viewed under 40$\times$ magnification, and the track sizes vary from approximately 1 to 3 $\mu$m in diameter. The tissue appears slightly out of focus but is clearly seen in the background. Focusing in this manner is especially useful when the nuclei and cytoplasm of the cells have not absorbed much stain, and thus the contrast of tracks against the background is considerable. The second approach involves focusing on a plane between the tracks and the tissue. The scattered light going through the $\alpha$ tracks will appear as white "holes" in the image. The tissue is seen better than in the first approach. This method is particular useful when the tissue absorbs a dark stain or when there are features in the tissue that appear dark (e.g., melanin in melanoma cells).

The autoradiographs were digitized with 256 gray levels. In order to convert pixel information to "real world" dimensions, it was necessary to calibrate the image analysis system with an image of known dimensions. The scaling information on the autoradiographs is obtained by digitizing a glass slide that has a grid with known dimensions. The image is then processed with a gradient edge detection filter, producing two objects from which the distance to the centers is determined by averaging all points along a common vertical axis.

A histogram expansion method was used to enhance the images which had histograms that did not make use of all available gray values. For such images the histogram was expanded to cover all gray values; i.e., the gray values with frequencies greater than zero were remapped to all the values available in the spectrum. This histogram modification technique enhances the contrast of the features in the original image. The enhancement is very useful since it facilitates the detection of edges and hence the final segmentation of the image.

The general approach used to process the autoradiographic images was to find digital image processing algorithms that are capable of extracting track and tissue morphology information. That is, ideally one wants to be able to separate the autoradiographic image into two components: the image of the tracks alone; and the image of the background that includes the cells, the extracellular space, and the freezing artifacts as well as other artifacts.

Several algorithms have been developed in image analysis to handle noisy images. In particular, a great deal of research has been done in the reconstruction of noisy images sent to earth from space as part of the U.S. space program. Scientists at the Jet Propulsion Lab (JPL) in Pasadena Calif., have pioneered many of the modern image processing tools and published several papers in the field. Many of this algorithams are well summarized by Andrews et. al. in *Digital Image Restortation*, Prentice-Hall, Inc., Englewood Cliffs, N.J., (1977).

Smoothing filters have been applied in digital image processing to reduce noise. These filters are used primarily for diminishing spurious effects that may be present in digital images as a result of poor sampling, or to reduce the distracting effect of quantum noise. Smoothing techniques can be done in both spatial and frequency domains.

In general, image filtration serves a variety of purposes in image processing, such as: detection of edges along a specific direction, contouring of patterns, noise reduction, detail enhancement or smoothing.

The extraction of tracks also can be accomplished using frequency-domain methods (i.e., based on the Fourier transform of an image). Edges and other sharp transitions in the gray levels of an image contribute heavily to the high frequency content of its Fourier transform. It therefore follows that blurring can be achieved via the frequency domain by attenuating a specified range of high frequency components in the Fourier transform of a given image.

The α-tracks correspond to the high frequencies, i.e., they are the sharp transitions in the gray levels of the image and lie in the outer border of the Fourier spectrum image. The rest of the image objects, i.e., the background and cell structure information, lie in the center of the Fourier spectrum image.

Separation of tracks can be achieved by "filtering out" the low frequency part of the image. A low pass filter approach that can separate the low frequency part of an image from the high frequency part is called a "two-dimensional ideal low pass filter" (ILPF) and is one whose transfer function satisfies the relation:

$$H(u,v) = \begin{cases} 1 & \text{if } D(u, v) \leq D_0 \\ 0 & \text{if } D(u, v) > D_0 \end{cases}$$

where $D_0$ is a specified non-negative quantity, and $D(u, v)$ is the radial distance from point $(u, v)$ to the origin of the frequency plane. That is:

$$D(u, v) = (u^2 + v^2)^2$$

The name ideal arises from the fact that all the frequencies inside a circle of radius are passed with no attenuation, while all frequencies outside this circle are completely attenuated.

The point of transition between $H(u, v)=1$ and $H(u, v)=0$ is called the cut-off frequency. In the described embodiment, the cut-off frequency was chosen such that the circle in the spatial frequency domain encloses 80% of the image power.

After performing the low pass filtering the image is restored. This is accomplished by applying the inverse Fourier transform to the filtered image. In the restored image, the tracks have disappeared and only the tissue is visible. If this image is now subtracted from the original image, one is left with an image of the tracks alone.

The separation of tracks is achieved by converting the image into a binary image by means of thresholding. Thresholding consists of partitioning an image into two regions: an object region and a background region. This operation allows one first to extract areas from an image that correspond to important structures or objects and it focuses the subsequent analysis on these structures or objects. Thresholding is done by selecting a range of gray level values [$T_{lower}$, $T_{upper}$] such that pixels between these two values are set to a constant value of 255, while the other pixels are set to 0. That is, for each pixel P, if $T_{lower} \leq P \leq T_{upper}$, then P is set to the value 255, else P is set to 0. Thus, a binary image is simply defined as an image whose pixel values have been converted into either black(255) or white(0). Moreover, the thresholded image can be enhanced even more by drawing a small boundary around each track, this is accomplished by applying a Laplacian filter, whose mask is of the form:

−1 −2 −1
−2 12 −2
−1 −2 −1

After the image has been processed by the above-mentioned edge-detection algorithms, a black line appears around all detected boundaries. Once the algorithm has detected a boundary the image can be segmented, leaving only an image in which the background has been removed.

Segmentation is especially useful when one wants to establish the boron content in specific regions of an autoradiograph. For instance, one can isolate the nuclei in the tissue image and determine the boron content of that region. This information is extremely important to assess the specificity of a potential boron drug. One could determine if a given boron drug has affinity with the nuclei or if it is distributed homogeneously throughout the tissue.

The final steps in the analysis of an autoradiograph after completely separating the tracks from the processed image consists of automatically counting the number of tracks in specified regions and correlating the track densities found to the boron concentrations using a calibration curve such as the one shown in FIG. 8.

One problem that must be overcome is that of accounting for tracks that are very close together and might therefore be counted as one. This is resolved by counting "holes" rather than "tracks." A hole is formed when two or more tracks are very close together such that the boundary that is established with the Laplacian filter is drawn around all of them leaving empty spaces in the center. So, a counting algorithm should be able to count not only the number of tracks but also the number of holes and their correspondent areas. The total number of tracks is then computed by summing the total number of holes rather than the number of particles or objects found.

Other embodiments are within the following claims.
What is claimed is:

1. A detector assembly for use in obtaining alpha-track autoradiographs, said detector assembly comprising:
   a substantially boron-free substrate;
   a detector layer deposited on the substantially boron-free substrate, said detector layer being capable of recording alpha particle tracks and exhibiting evidence of said alpha tracks in response to being exposed to an etchant, said detector layer being less than about 2 microns thick; and
   a protective layer deposited on the detector layer, said protective layer being resistant to said etchant and having a thickness in the range of about 0.5 to 1 microns.

2. The detector assembly of claim 1 wherein the substantially boron-free substrate is made of quartz.

3. The detector assembly of claim 2 wherein the substantially boron-free substrate is a quartz microslide.

4. The detector assembly of claim 1 wherein the detector layer is made of bisphenol-A polycarbonate.

5. The detector assembly of claim 1 wherein the protective layer is made from a vinylidine chloride/vinyl chloride solution.

6. The detector assembly of claim 5 wherein the protective layer is made from a polyvinylidine chloride.

7. The detector assembly of claim 1 wherein the protective layer is about 0.8 microns thick.

8. The detector assembly of claim 1 wherein the detector layer is less than about 1 micron thick.

* * * * *

UNITED STATES PATENT AND TRADEMARK OFFICE
CERTIFICATE OF CORRECTION

PATENT NO. : 5,376,800
DATED : December 27, 1994
INVENTOR(S) : Guido Solares, et al.

It is certified that error appears in the above-indentified patent and that said Letters Patent is hereby corrected as shown below:

Col. 3, line 37, replace "a" with --an--.

Col. 4, line 10, delete "are".

Col. 5, lines 61-62, replace "$^{23}Na(n,\gamma)^{2-4}Na(\delta=0.53$ barns, $T_{\frac{1}{2}}=15$ hrs.)" with --$^{23}Na(n,\gamma)^{24}Na$--.

Col. 7, line 26, replace "$cm^2$" with --$cm^{-2}$--.

Col. 7, line 31, replace "$cm^{-1}$" with --cm--.

Col. 8, line 27 replace "(Plasticizers)" with --(Plasticizers).--

Col. 8, line 28 replace "(Plasticizers)" with --(Plasticizers).--

Col. 9, line 33, replace "on" with --of--.

Col. 9, line 38, replace "where" with --were--.

Col. 11, line 5, after "as" insert --to--.

Col. 11, line 6, delete the second period.

UNITED STATES PATENT AND TRADEMARK OFFICE
CERTIFICATE OF CORRECTION

PATENT NO. : 5,376,800
DATED : December 27, 1994
INVENTOR(S) : Guido Solares, et al.

It is certified that error appears in the above-indentified patent and that said Letters Patent is hereby corrected as shown below:

Col. 11, line 65, replace "polyethelene" with --polyethylene--.

Col. 12, line 8, replace "a" with --an--.

Col. 13, line 17, replace "dissolve" with --dissolved--.

Col. 13, line 25, replace "form" with --from--.

Col. 15, line 62, replace "Its" with --It is--.

Col. 16, line 68, replace "47:51-5454" with --47:5451-5454--.

Col. 17, line 49, replace "form" with --from--.

Col. 18, line 29, replace "other-wise" with --otherwise--.

Col. 19, line 11, replace "TD=Track density, tracks/$Mm^2$." with --TD=Track density, tracks/$\mu m^2$--.

Col. 19, lines 19-20, replace "provided" with --provide--.

UNITED STATES PATENT AND TRADEMARK OFFICE
CERTIFICATE OF CORRECTION

PATENT NO. : 5,376,800
DATED : December 27, 1994
INVENTOR(S) : Guido Solares, et al.

It is certified that error appears in the above-indentified patent and that said Letters Patent is hereby corrected as shown below:

Col. 20, line 12, replace "particular" with --particularly--.

Col. 20, line 54, replace "this" with --these--.

Col. 20, line 54, replace "algorithams" with --algorithms--.

Col. 21, line 43, replace "filtering" with --filtering,--.

Col. 21, line 54, replace "correspond" with --corresponds--.

Signed and Sealed this

Sixteenth Day of April, 1996

BRUCE LEHMAN

Attest:

Attesting Officer

Commissioner of Patents and Trademarks